(12) United States Patent
Onitsuka

(10) Patent No.: US 12,397,784 B2
(45) Date of Patent: Aug. 26, 2025

(54) VEHICLE CONTROL SYSTEM

(71) Applicant: TOYOTA JIDOSHA KABUSHIKI KAISHA, Toyota (JP)

(72) Inventor: Masakatsu Onitsuka, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 298 days.

(21) Appl. No.: 18/164,869

(22) Filed: Feb. 6, 2023

(65) Prior Publication Data
US 2023/0278549 A1  Sep. 7, 2023

(30) Foreign Application Priority Data
Mar. 3, 2022 (JP) ................. 2022-032467

(51) Int. Cl.
*B60W 30/09* (2012.01)
*B60R 21/0136* (2006.01)
*B60W 30/12* (2020.01)
*B60W 40/08* (2012.01)

(52) U.S. Cl.
CPC ......... *B60W 30/09* (2013.01); *B60R 21/0136* (2013.01); *B60W 30/12* (2013.01); *B60W 40/08* (2013.01)

(58) Field of Classification Search
CPC ...... B60W 30/09; B60W 30/12; B60W 40/08; B60W 2520/10; B60W 2520/105; B60W 2540/221; B60W 10/06; B60W 10/18; B60W 10/20; B60W 30/182; B60W 50/082; B60W 50/087; B60W 2050/143; B60W 50/14; B60W 10/10; B60W 30/085; B60W 2420/54; B60W 2510/10; B60W 2510/20; B60W 2540/10; B60W 2540/12; B60W 2710/06; B60W 2710/10; B60W 2710/18; B60W 2710/20; B60R 21/0136; B60T 7/12
USPC ........................................... 701/36
See application file for complete search history.

(56) References Cited

U.S. PATENT DOCUMENTS

| 7,692,534 B2 | 4/2010 | Kataoka et al. |
| 8,352,124 B2 | 1/2013 | Taguchi |
| 8,682,500 B2 | 3/2014 | Sakugawa |
| 8,818,634 B2 | 8/2014 | Fujita et al. |

(Continued)

FOREIGN PATENT DOCUMENTS

JP   2012-252500 A   12/2012

*Primary Examiner* — B M M Hannan
(74) *Attorney, Agent, or Firm* — Sughrue Mion, PLLC

(57) ABSTRACT

A vehicle control system includes an on-vehicle sensor for outputting a piece of information regarding an object around an own vehicle and a piece of information regarding a travel state of the own vehicle, a driving assistant ECU which has, as a risk reduction function, at least one of a lane departure prevention function and an emergency stop function, and a switching apparatus for enabling and disabling the risk reduction function. The lane departure prevention function prevents departure of the own vehicle from a lane in which the own vehicle is travelling. The emergency stop function stops the own vehicle when a driver is suffering from an abnormal condition. In the case where the own vehicle collides with an object in a state in which the risk reduction function has been disabled by the switching apparatus, the driving assistant ECU forcedly enables the risk reduction function.

5 Claims, 6 Drawing Sheets

(56) References Cited

U.S. PATENT DOCUMENTS

| | | |
|---|---|---|
| 9,168,953 B2 | 10/2015 | Mitsumoto et al. |
| 9,714,034 B2 | 7/2017 | Otake et al. |
| 9,880,558 B2 | 1/2018 | Nakamura |
| 9,902,399 B2 | 2/2018 | Torii et al. |
| 10,345,443 B2 | 7/2019 | Masui et al. |
| 10,611,240 B2 | 4/2020 | Masui et al. |
| 2019/0077401 A1* | 3/2019 | Katagiri ................ B60W 10/18 |
| 2021/0016783 A1* | 1/2021 | Watanabe ....... B60W 30/18154 |
| 2022/0063667 A1* | 3/2022 | Wolff ................. B60W 60/0011 |
| 2022/0297541 A1* | 9/2022 | Aurand ................ B60W 50/10 |

* cited by examiner

VEHICLE CONTROL SYSTEM

BACKGROUND OF THE INVENTION

Field of the Invention

The present invention relates to a vehicle control system which has a function of enhancing safety of a vehicle.

Description of the Related Art

There has been known a vehicle control system (hereafter referred to as the "conventional system") which has a function of enhancing safety of an own vehicle (hereinafter referred to as a "risk reduction function") (see, for example, Japanese Patent Application Laid-Open (kokai) No. 2012-252500). This conventional system has, as the risk reduction function, functions used when the own vehicle deviates from a widthwise center portion of a lane toward an edge (right edge or left edge) of the lane; i.e., a function of reproducing a predetermined warning sound, and a function of controlling a steering apparatus, a drive apparatus, a braking apparatus, etc. (through automatic steering, automatic braking, etc.) such that the own vehicle returns to the widthwise center portion of the lane (hereinafter, these functions are collectively referred to as a "lane departure prevention function").

Incidentally, in some cases, a vehicle control system having a risk reduction function as described above is configured to allow a driver to manually perform switching between a state in which the risk reduction function is enabled and a state in which the risk reduction function is disabled. In such a case, in a state in which the risk reduction function has been manually disabled, reproduction of a warning sound, automatic steering, automatic braking, or the like is not performed even when the own vehicle falls into a situation which is unfavorable in terms of safety.

SUMMARY OF THE INVENTION

One object of the present invention is to provide a vehicle control system which can enhance safety of a vehicle.

In order to solve the above-described problem, a vehicle control system (1) of the present invention comprises:
- an on-vehicle sensor (20) for outputting a piece of information regarding an object around an own vehicle and a piece of information regarding a travel state of the own vehicle;
- a control apparatus (10) which has, as a risk reduction function, at least one of a lane departure prevention function and an emergency stop function, the lane departure prevention function controlling at least one of a warning apparatus (24), a drive apparatus (30), a braking apparatus (40), and a steering apparatus (60) of the own vehicle, on the basis of the pieces of information obtained from the on-vehicle sensor, such that departure of the own vehicle from a lane in which the own vehicle is travelling is prevented, the emergency stop function stopping the own vehicle when a driver is suffering from an abnormal condition; and
- a switching apparatus (2b) for enabling and disabling the risk reduction function.

The control apparatus is configured to forcedly enable the risk reduction function when the own vehicle collides with an object in a state in which the risk reduction function has been disabled by the switching apparatus.

The switching apparatus is, for example, a switch which can be manually operated by a driver (occupant). Alternatively, the switching apparatus includes, for example, an apparatus which automatically disables the lane departure prevention function upon detection that the driver has intentionally performed a lane change and an apparatus which automatically enables the lane departure prevention function upon detection that the driver is suffering from an abnormal condition.

In a vehicle on which the above-described vehicle control system is mounted, the risk reduction function is enabled and disabled by the switching apparatus. For example, when the own vehicle departs from a lane and collides with an object in a state in which the risk reduction function has been disabled, the risk reduction function is forcedly enabled. As a result, for example, in the case where the control apparatus has the lane departure prevention function as the risk reduction function, in a situation where it has become difficult for the driver to drive and operate the own vehicle, the driving and operation are assisted by the control apparatus. Also, in the case where the control apparatus has the emergency stop function as the risk reduction function, in a situation where the driver has become unable to drive and operate the own vehicle, the control apparatus stops the own vehicle. Accordingly, the vehicle control system according to the present invention can enhance safety of the vehicle as compared with the conventional system.

The control apparatus may determine that the own vehicle has lightly collided with an object in the case where the magnitude of acceleration (G) of the own vehicle falls within a predetermined range (GA) of acceleration greater than accelerations which may occur during an ordinary travel, and an integral value of the magnitude of acceleration of the own vehicle has exceeded a threshold value, the integral value of the magnitude of acceleration being that over a predetermined time from a point in time when the magnitude of the acceleration has exceeded a lower limit of the predetermined range.

By virtue of this configuration, the risk reduction function can be forcedly enabled in a situation where the own vehicle has collided with the object relatively lightly (for example, a collision which does not cause an airbag apparatus to operate).

The switching apparatus may include a first operating element (2b1) for manually enabling and disabling the lane departure prevention function and a second operating element (2b2) for manually enabling and disabling the emergency stop function, and, in the case where the own vehicle departs from the lane and collides with an object in a state in which at least one of the lane departure prevention function and the emergency stop function has been manually disabled, the control apparatus may forcedly enable the function disabled manually.

This configuration allows the driver to enable part of the risk reduction functions, and disable the remaining function(s) according to the driver's preference.

The risk reduction function may be the emergency stop function, and the control apparatus may control the braking apparatus so as to immediately stop the own vehicle, irrespective of whether or not the driver is suffering from an abnormal condition, in the case where the speed of the own vehicle exceeds a threshold value in a period between a point in time when the control apparatus has forcedly enabled the risk reduction function and a point in time when braking of the own vehicle by the emergency stop function is started.

By virtue of this configuration, for example, in the case where the own vehicle hits against an object at a relatively high speed, the own vehicle can be stopped immediately.

DESCRIPTION OF THE PREFERRED EMBODIMENT (Outline of Configuration)

Figure 1:
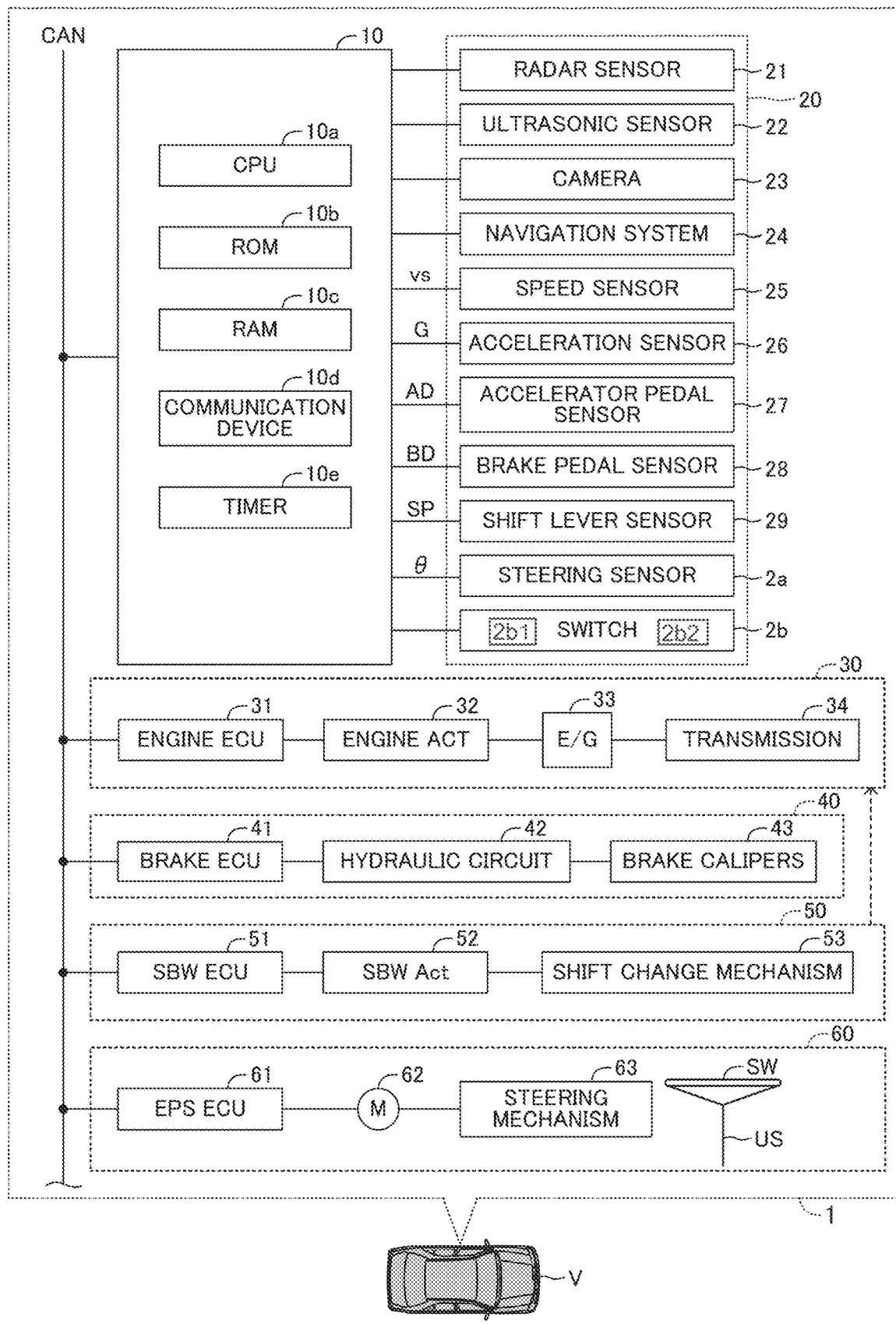
FIG. 1 is a block diagram of a vehicle control system according to one embodiment of the present invention.

As shown in FIG. 1, a vehicle control system 1 according to one embodiment of the present invention is mounted on a vehicle V (hereinafter referred to as the "own vehicle" in some cases). As will be described in detail later, the vehicle control system 1 has a risk reduction function which enhances safety of the own vehicle. The risk reduction function includes not only a lane departure prevention function which is the same as that of the above-described conventional system but also an emergency stop function of immediately stopping the own vehicle when a driver is suffering from an abnormal condition. The driver can manually perform switching between a state in which the risk reduction function is enabled and a state in which the risk reduction function is disabled; namely, the driver can manually enable and disable the risk reduction function. Furthermore, the vehicle control system 1 has a compulsory activation function of forcedly enabling the risk reduction function when a predetermined condition is satisfied.

(Specific Configuration)

As shown in FIG. 1, the vehicle control system 1 includes a driving assistant ECU 10, on-vehicle sensors 20, a drive apparatus 30, a braking apparatus 40, a shift change apparatus 50, and a steering apparatus 60.

The driving assistant ECU 10 includes a microcomputer having a CPU 10a, a ROM 10b, a RAM 10c, etc. Notably, in the present specification, "ECU" means an electronic control apparatus (electronic control unit) and includes a microcomputer having a CPU, a ROM, a RAM, etc. The CPU realizes various functions by executing instructions stored in the ROM. Furthermore, the driving assistant ECU 10 includes a communication device 10d which exchanges pieces of information with a server computer via a radio communication line. In addition, the driving assistant ECU 10 includes a timer 10e for time measurement.

The driving assistant ECU 10 is connected to other ECUs (an engine ECU 31, a brake ECU 41, an SBW ECU 51, and an EPS ECU 61, which will be described later) via a CAN (controller area network) such that pieces of information can be transmitted and received therebetween.

The on-vehicle sensors 20 include sensors for obtaining pieces of vehicle surrounding information, including information regarding three-dimensional objects present around the vehicle V and information regarding division lines on a road surface around the vehicle V. Namely, the on-vehicle sensors 20 include, for example, sensors for obtaining pieces of information regarding moving objects such as automobiles (other vehicles), pedestrians, and bicycles and stationary objects such as white lines on the road surface, guard rails, and traffic signals.

Specifically, the on-vehicle sensors 20 include a radar sensor 21, an ultrasonic sensor 22, a camera 23, and a navigation system 24.

The radar sensor 21 includes a radar transmission/reception section and a signal processing section (not shown). The radar transmission/reception section radiates a radio wave in the millimeter wave band (hereinafter referred to as "millimeter wave") to a region around the vehicle, and receives a millimeter wave (i.e., reflection wave) reflected by a three-dimensional object present in the region to which the millimeter wave is radiated. The signal processing section computes the distance between the vehicle V and the three-dimensional object, the relative speed between the vehicle V and the three-dimensional object, the position (direction) of the three-dimensional object in relation to the vehicle V, etc. on the basis of the phase difference between the transmitted millimeter wave and the received reflection wave, the level of attenuation of the reflection wave, the time elapsed until the reflection wave is received after the millimeter wave has been transmitted, etc. The signal processing section transmits the computed distance, relative speed, etc. to the driving assistant ECU 10.

The ultrasonic sensor 22 transmits an ultrasonic wave in the form of pulses to a predetermined region around the vehicle and receives a reflection wave from a three-dimensional object. The ultrasonic sensor 22 computes a "reflection point which is a point on the three-dimensional object at which the transmitted ultrasonic wave is reflected," the "distance between the ultrasonic sensor and the three-dimensional object," etc. on the basis of the time elapsed until the reflection wave is received after the ultrasonic wave has been transmitted. The ultrasonic sensor 22 transmits the computed reflection point, distance, etc. to the driving assistant ECU 10.

The camera 23 includes an image capturing device and an image analyzing device. The image capturing device is, for example, a digital camera including an image sensor such as a CCD (charge coupled device) or a CIS (CMOS image sensor). The image capturing device is disposed on an upper portion of a front windshield glass. The image capturing device obtains image data by capturing an image of a scene ahead of the vehicle at a predetermined frame rate and outputs the image data to the image analyzing device. The image analyzing device analyzes the obtained image data and obtains, from the image, pieces of information regarding objects located ahead of the vehicle V. The image analyzing device recognizes, for example, white lines (division line, stop line, etc.) on a road and transmits the recognition results to the driving assistant ECU 10.

The navigation system 24 receives GPS signals from a plurality of artificial satellites and detects the present position (latitude and longitude) of the vehicle V on the basis of the received GPS signals. Also, the navigation system 24 stores map data representing a map. The navigation system 24 transmits vehicle position data to the driving assistant ECU 10. The vehicle position data represent the detected present position.

The on-vehicle sensors 20 further include sensors for obtaining pieces of information regarding the travel state (speed, acceleration) of the vehicle V and pieces of information regarding the operation states of operating elements provided in the vehicle V.

Specifically, the on-vehicle sensors 20 include a speed sensor 25, an acceleration sensor 26, an accelerator pedal sensor 27, a brake pedal sensor 28, a shift lever sensor 29, a steering sensor 2a, and a switch 2b.

The speed sensor 25 includes a wheel speed sensor which generates one pulse signal (wheel pulse signal) every time each wheel of the own vehicle rotates a predetermined angle. The speed sensor 25 measures the number of pulses per unit time of the wheel pulse signal transmitted from the wheel speed sensor. The speed sensor 25 computes the rotational speed (wheel speed) of each wheel on the basis of the measured number of pulses, and computes the speed vs (actual speed) of the own vehicle on the basis of the wheel speed of each wheel. The speed sensor 25 transmits data representing the speed vs to the driving assistant ECU 10.

The acceleration sensor 26 detects acceleration G of the vehicle V (for example, acceleration in the vehicle width direction of the vehicle V, acceleration in the front-rear direction of the vehicle V, etc.). The acceleration sensor 26 transmits data representing the acceleration G to the driving assistant ECU 10.

The accelerator pedal sensor 27 detects the amount of depression (AD) of an accelerator pedal (not shown) of the vehicle V. The accelerator pedal sensor 27 transmits data representing the amount of depression AD of the accelerator pedal to the driving assistant ECU 10.

A brake pedal sensor 28 detects the amount of depression (BD) of a brake pedal (not shown) of the vehicle V. The brake pedal sensor 28 transmits data representing the amount of depression BD of the brake pedal to the driving assistant ECU 10.

The shift lever sensor 29 detects the position of a shift lever (not shown) of the vehicle V (shift lever position SP). The shift lever sensor 29 transmits data representing the shift lever position SP to the driving assistant ECU 10.

The steering sensor 2a detects the steering angle θ of the steering wheel. The steering sensor 2a transmits data representing the detected steering angle θ to the driving assistant ECU 10.

The switch 2b is an operating element (for example, a push-button-type switch operating element). A driver operates the switch 2b for enabling and disabling the risk reduction function. In the case where the driver operates the switch 2b (pushes a button) in a period during which the risk reduction function is disabled, the switch 2b transmits to the driving assistant ECU 10 an enablement signal representing that "the driver requests enablement of the risk reduction function." When the driving assistant ECU 10 receives the enablement signal, the driving assistant ECU sets the value of a flag F to "1." In the case where the driver operates the switch 2b in a period during which the risk reduction function is enabled, the switch 2b transmits to the driving assistant ECU 10 a disablement signal representing that "the driver requests disablement of the risk reduction function." When the driving assistant ECU 10 receives the disablement signal, the driving assistant ECU sets the value of the flag F to "0."

The drive apparatus 30 generates drive power and applies the drive power to drive wheels among all wheels (a front left wheel, a front right wheel, a rear left wheel, and a rear right wheel). The drive apparatus 30 includes an engine ECU 31, an engine actuator 32, an internal combustion engine 33, a transmission 34, an unillustrated drive power transmission mechanism for transmitting the drive power to the wheels, etc. The engine ECU 31 is connected to the engine actuator 32. The engine actuator 32 includes a throttle valve actuator for changing the opening degree of a throttle valve of the internal combustion engine 33. The engine ECU 31 obtains the accelerator pedal depression amount AD from the driving assistant ECU 10. Notably, the driving assistant ECU 10 can transmit the depression amount AD obtained from the accelerator pedal sensor 27 to the engine ECU 31 after appropriately correcting the depression amount AD. The engine ECU 31 drives the engine actuator 32 in accordance with the depression amount AD obtained from the driving assistant ECU 10. In this manner, the torque generated by the internal combustion engine 33 is controlled. The torque generated by the internal combustion engine 33 is transmitted to the drive wheels via the transmission 34 and the drive power transmission mechanism (for example, a drive shaft).

Notably, in the case where the vehicle V to which the vehicle control system 1 is applied is a hybrid vehicle (HEV), the engine ECU 31 can control the vehicle drive power generated by either or both of "an internal combustion engine and an electric motor," which serve as vehicle drive sources. Also, in the case where the vehicle V to which the vehicle control system 1 is applied is a battery electric vehicle (BEV), instead of the engine ECU 31, a motor ECU may be used so as to control the vehicle drive power generated by "an electric motor," which serves as a vehicle drive source.

The braking apparatus 40 applies braking forces to the wheels. The braking apparatus 40 includes a brake ECU 41, a hydraulic circuit 42, and brake calipers 43. The hydraulic circuit 42 includes, for example, a reservoir, an oil pump, various valve devices, and an oil pressure sensor, which are not illustrated. Each brake caliper 43 is a hydraulic actuator having a cylinder and a piston. When oil is supplied to the cylinder, the piston is pushed out from the cylinder. A brake pad is provided at the distal end of the piston, and this brake pad is pressed against a brake disc. The brake ECU 41 obtains the brake pedal depression amount BD from the driving assistant ECU 10. Notably, the driving assistant ECU 10 can transmit the depression amount BD obtained from the brake pedal sensor 28 to the brake ECU 41 after appropriately correcting the depression amount BD. The brake ECU 41 transmits an oil pressure control instruction to the hydraulic circuit 42 in accordance with the depression amount BD obtained from the driving assistant ECU 10. The hydraulic circuit 42 adjusts the oil pressure within the cylinder of the brake caliper 43 in accordance with the oil pressure control instruction obtained from the brake ECU 41. In this manner, the braking force applied to the corresponding wheel (brake disc) by the brake caliper 43 is controlled.

The shift change apparatus 50 changes the shift position of the transmission 34. The shift change apparatus 50 includes an SBW (shift-by-wire) ECU 51, an SBW actuator 52, a shift change mechanism 53, etc. The SBW ECU 51 is connected to the SBW actuator 52. The SBW ECU 51 obtains the shift lever position SP from the driving assistant ECU 10. The driving assistant ECU 10 can transmit the shift lever position SP to the SBW ECU 51 after appropriately correcting the shift lever position SP obtained from the shift lever sensor 29. The SBW ECU 51 transmits a shift change instruction to the SBW actuator 52 in accordance with the shift lever position SP obtained from the driving assistant ECU 10. The SBW actuator 52 controls the shift change mechanism 53 in accordance with the shift change instruction obtained from the SBW ECU 51. In this manner, the shift position of the transmission 34 is changed.

The steering apparatus 60 controls the steering angle of the steerable wheels (the front left wheel and the front right wheel). The steering apparatus 60 includes an electric power steering ECU (hereinafter referred to as the "EPS ECU") 61, an assist motor 62, and a steering mechanism 63. The EPS ECU 61 is connected to the assist motor 62 (to a drive circuit for the assist motor 62). The assist motor 62 is built in the steering mechanism 63. The steering mechanism 63 is a mechanism for steering the steerable wheels. The steering mechanism 63 includes a steering wheel SW, a steering shaft US, an unillustrated steering gear mechanism, etc. The EPS ECU 61 obtains the steering angle θ from the driving assistant ECU 10. Notably, the driving assistant ECU 10 can transmit the steering angle θ to the EPS ECU 61 after appropriately correcting the steering angle θ obtained from the steering sensor 2a. The EPS ECU 61 can transmit a steering instruction to the EPS ECU 61 in accordance with the steering angle θ obtained from the driving assistant ECU 10. Upon receipt of the steering instruction from the driving assistant ECU 10, the EPS ECU 61 drives the assist motor 62 on the basis of the steering instruction. In this manner, the steering angle of the steerable wheels of the vehicle V is controlled.

(Lane Departure Prevention Function)

Figure 2:
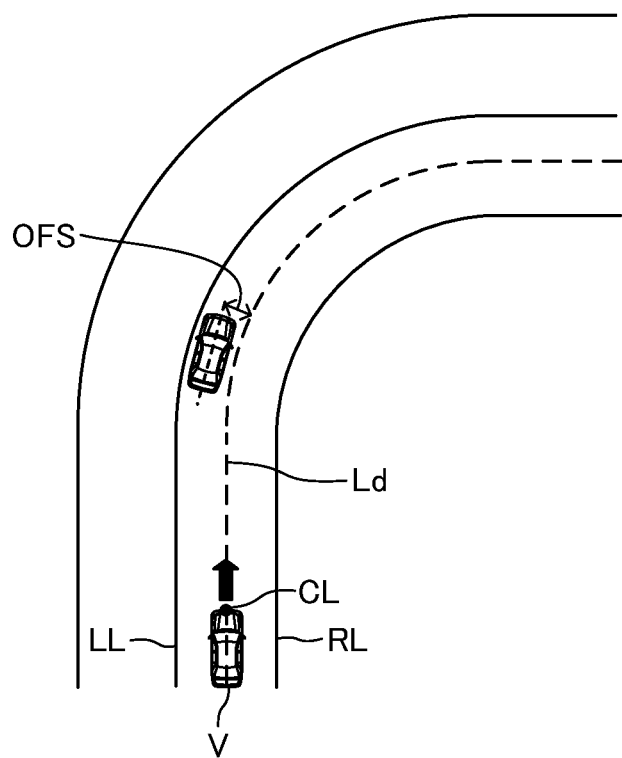
FIG. 2 is a plan view showing a scene in which a vehicle has slightly deviated leftward from a widthwise center portion of a lane.

Next, the lane departure prevention function (LTA: lane tracing assist) of the vehicle control system 1 will be described. In a state in which the risk reduction function is enabled (F=1), the driving assistant ECU 10 computes a target travel line Ld on the basis of pieces of information obtained from the radar sensor 21, the ultrasonic sensor 22, and the camera 23. As shown in FIG. 2, the target travel line Ld is located at a center position between a white line RL (or a curb, a separating zone, or the like) on the right side of a lane in which the vehicle V is travelling and a white line LL (or a curb, a separating zone, or the like) on the left side of the lane. The target travel line Ld extends approximately parallel to the white line RL or the like on the right side of the lane and the white line LL or the like on the left side of the lane. Subsequently, the driving assistant ECU 10 computes a deviation of a center position CL of the front end of the own vehicle from the target travel line Ld (a deviation toward the right side or the left side in the width direction of the lane (hereinafter referred to as an "offset value OFS")).

Subsequently, the driving assistant ECU 10 issues a predetermined warning to the driver in a state in which the offset value OFS (absolute value) is greater than a threshold value OFSth. Specifically, the driving assistant ECU 10 causes a sound apparatus of the navigation system 24 to reproduce a predetermined warning sound. Furthermore, the driving assistant ECU 10 controls the steering apparatus 60 and optionally the drive apparatus 30 and/or the braking apparatus 40 such that the offset value OFS becomes zero. In the following description, the control (warning/steering/accelerating or decelerating) for preventing departure of the own vehicle from the lane will be referred to as "lane departure prevention control."

(Emergency Stop Function)

Next, the emergency stop function (EDSS: emergency driving stop system) of the vehicle control system 1 will be described. In the state in which the risk reduction function is enabled (F=1), the driving assistant ECU 10 monitors the amount by which each operating element is operated within a predetermined short period of time (a change in the output value of the sensor of each operating element). Namely, the driving assistant ECU 10 repeatedly obtains the accelerator pedal depression amount AD, the brake pedal depression amount BD, the steering wheel steering angle θ, etc. When a state in which none of the operation amounts of all the operating elements changes continues for a threshold time t1 or more, the driving assistant ECU 10 provides a predetermined warning. Furthermore, when the state in which none of the operation amounts of all the operating elements changes continues for a threshold time t2 or more from the point of provision of the warning, the driving assistant ECU 10 stops the own vehicle by controlling the braking apparatus 40, the steering apparatus 60, etc. Furthermore, when the state in which none of the operation amounts of all the operating elements changes continues for a threshold time t3 or more from the point when the own vehicle has been stopped, the driving assistant ECU 10 provides a report (for example, transmits the position information (latitude and longitude) of the own vehicle) to a predetermined server computer via a radio communication line.

(Compulsory Activation Function)

Figure 3:
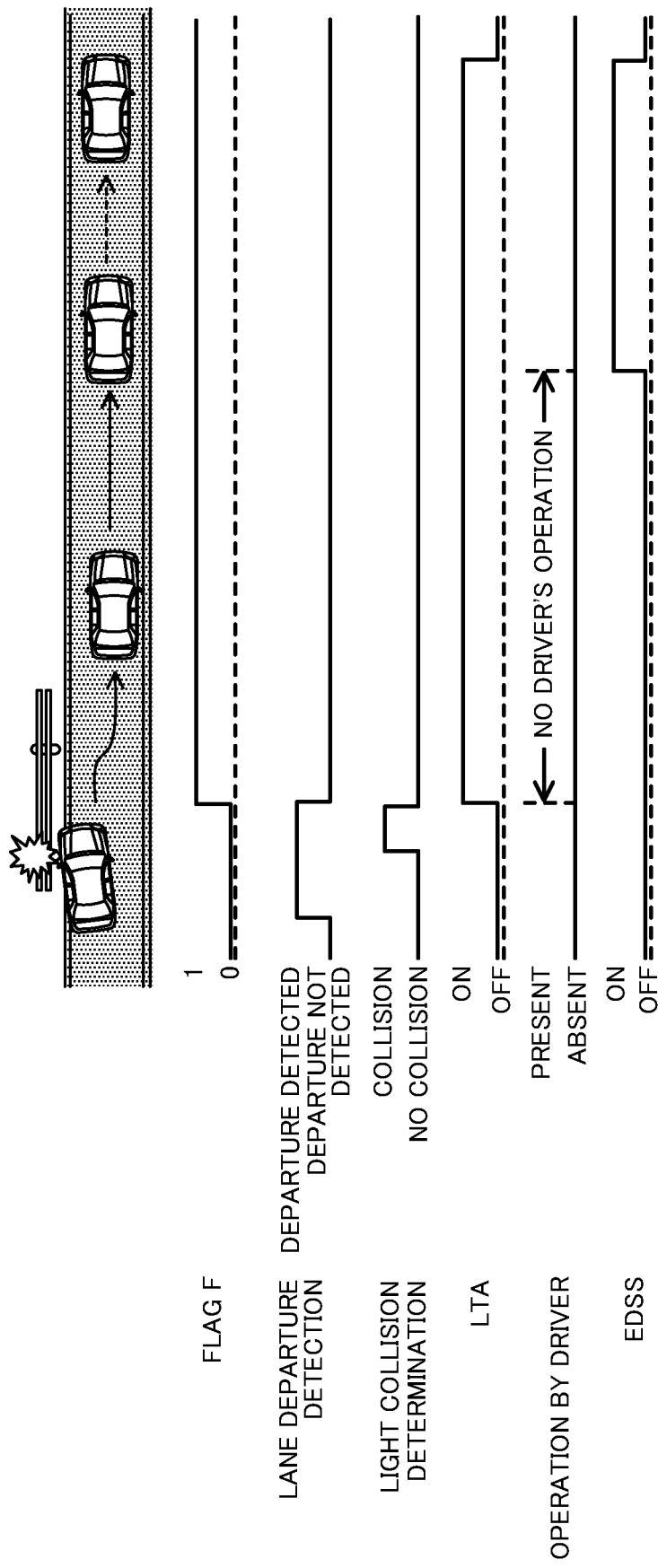
FIG. 3 is a time chart showing a process of execution of various types of controls when the own vehicle departs from a lane and lightly collides with an object.

Next, the compulsory activation function of the vehicle control system 1 will be described. When, in a state in which the risk reduction function is disabled (F=0), the driving assistant ECU 10 determines on the basis of the pieces of information obtained from the on-vehicle sensors 20 that, as shown in FIG. 3, the own vehicle has departed from the lane (on which the vehicle has traveled for a predetermined period of time or longer) and lightly collided with an object (for example, a guard rail or the like) (occurrence of a collision which is light so that an airbag apparatus does not operate), the driving assistant ECU 10 forcedly enables the risk reduction function (F=1). Namely, the driving assistant ECU 10 switches the value of the flag F from "0" to "1" despite of the switch 2b being not operated (compulsory activation). The driving assistant ECU 10 determines that the own vehicle has lightly collided with an object, for example, when a condition X described below is satisfied.

(Condition X).

The magnitude of the acceleration G falls within a predetermined range GA, and the integral value of the magnitude of the acceleration G has exceeded a threshold value, the integral value of the magnitude of the acceleration being that over a predetermined time from a point in time when the magnitude of the acceleration G has exceeded the lower limit (>0) of the range GA.

Notably, the range GA is determined beforehand as a range of acceleration which is greater than accelerations occurring in ordinary driving states (sudden deceleration (forward G), sudden acceleration (rearward G), sudden turn (lateral G), and vibrations due to road surface (vertical G)) and which can be considered to occur as a result of light collision.

Furthermore, after forcedly enabling the risk reduction function, the driving assistant ECU 10 obtains the speed vs from the speed sensor 25. In the case where the speed vs is higher than a threshold value vsth (namely, in the case where the own vehicle has hit against an object at a relatively high speed), the driving assistant ECU 10 controls the braking apparatus 40, the steering apparatus 60, etc. such that the own vehicle stops immediately. In this case, regardless of whether or not the driver is operating an operating element(s), the driving assistant ECU 10 forcedly stops the own vehicle (compulsory stop function). The priority of this compulsory stoppage function is higher than those of the lane departure prevention function and the emergency stop function.

Notably, in the case where the acceleration G exceeds the upper limit of the range GA (the impact acting on the own vehicle is very large), the driving assistant ECU 10 (or another ECU) controls the braking apparatus 40, the steering apparatus 60, etc. such that the own vehicle stops immediately.

Next, operation of the CPU 10*a* of the driving assistant ECU 10 (hereinafter referred to simply as the "CPU") (programs P1, P2, and P3 which realize the lane departure prevention function, the emergency stop function, and the compulsory activation function, respectively) will be described with reference to FIGS. 4 to 6. During a period during which the engine of the own vehicle is operating (an ignition switch is in an ON state), the CPU executes the programs P1, P2, and P3 at predetermined intervals.
(Program P1)

The CPU starts execution of the program P1 from step 100 and proceeds to step 101.

When the CPU proceeds to step 101, the CPU determines whether or not the risk reduction function is enabled (whether or not the value of the flag F is "1"). In the case where the risk reduction function is enabled (101: Yes), the CPU proceeds to step 102. Meanwhile, in the case where the risk reduction function is disabled (101: No), the CPU proceeds to step 105 and ends the execution of the program P1.

When the CPU proceeds to step 102, the CPU computes the offset value OFS. Subsequently, the CPU proceeds to step 103.

When the CPU proceeds to step 103, the CPU determines whether or not the offset value OFS (absolute value) is equal to or smaller than a threshold value OFSth. In the case where the offset value OFS is equal to or smaller than the threshold value OFSth (103: Yes), the CPU proceeds to step 105. Meanwhile, in the case where the offset value OFS is larger than the threshold value OFSth (103: No), the CPU proceeds to step 104.

When the CPU proceeds to step 104, the CPU executes lane departure prevention control (warning/steering/accelerating or decelerating). The CPU then proceeds to step 105.
(Program P2)

The CPU starts execution of the program P2 from step 200 and proceeds to step 201. When the CPU proceeds to step 201, the CPU determines whether or not the risk reduction function is enabled (whether or not the value of the flag F is "1"). In the case where the risk reduction function is enabled (201: Yes), the CPU proceeds to step 202. Meanwhile, in the case where the risk reduction function is disabled (201: No), the CPU proceeds to step 215 and ends the execution of the program P2.

When the CPU proceeds to step 202, the CPU initializes a measured time ta (output value) of the timer 10*e* to "0" and causes the timer 10*e* to start time measurement. Subsequently, the CPU proceeds to step 203.

When the CPU proceeds to step 203, the CPU determines whether or not the driver is operating any of the operating elements (whether or not the operation amounts of all the operating elements (changes in the output values of the sensors) are "0"). In the case where the driver is operating none of the operating elements (the driver is suffering from an abnormal condition (203: Yes)), the CPU proceeds to step 204. Meanwhile, in the case where the driver is operating any of the operating elements (203: No), the CPU proceeds to step 215.

When the CPU proceeds to step 204, the CPU determines whether or not the measured time ta is greater than a threshold value t1. In the case where the measured time ta is greater than the threshold value t1 (204: Yes), the CPU proceeds to step 205. Meanwhile, in the case where the measured time ta is equal to or less than the threshold value t1, the CPU returns to step 203.

When the CPU proceeds to step 205, the CPU causes the navigation system 24 to reproduce a predetermined warning sound. Subsequently, the CPU proceeds step 206.

When the CPU proceeds to step 206, the CPU initializes the measured time ta (output value) of the timer 10*e* to "0" and again causes the timer 10*e* to start time measurement. Subsequently, the CPU proceeds to step 207.

When the CPU proceeds to step 207, the CPU determines whether or not the driver is operating any of the operating elements (whether or not the operation amounts of all the operating elements are "0"). In the case where the driver is operating none of the operating elements (207: Yes), the CPU proceeds to step 208. Meanwhile, in the case where the driver is operating any of the operating elements (207: No), the CPU proceeds to step 215.

When the CPU proceeds to step 208, the CPU determines whether or not the measured time ta is greater than a threshold value t2. In the case where the measured time ta is greater than the threshold value t2 (208: Yes), the CPU proceeds to step 209. Meanwhile, in the case where the measured time ta is equal to or less than the threshold value t2, the CPU returns to step 207.

When the CPU proceeds to step 209, the CPU brakes and stops the own vehicle (emergency stop). Namely, while flashing the hazard lights, the CPU controls the braking apparatus 40 and the steering apparatus 60 such that the own vehicle moves to a safe region (for example, a shoulder or a lane where the traffic volume is small), while decelerating, and stops there. Subsequently, the CPU proceeds to step 210. Notably, the CPU executes step 209 preferentially over the program P1.

When the CPU proceeds to step 210, the CPU initializes the measured time ta (output value) of the timer 10*e* to "0" and again causes the timer 10*e* to start time measurement. Subsequently, the CPU proceeds to step 211.

When the CPU proceeds to step 211, the CPU determines whether or not the driver is operating any of the operating elements (whether or not the operation amounts of all the operating elements are "0"). In the case where the driver is operating none of the operating elements (211: Yes), the CPU proceeds to step 212. Meanwhile, in the case where the driver is operating any of the operating elements (211: No), the CPU proceeds to step 215.

When the CPU proceeds to step 212, the CPU determines whether or not the measured time ta is greater than a threshold value t3. In the case where the measured time ta is greater than the threshold value t3 (212: Yes), the CPU proceeds to step 213. Meanwhile, in the case where the measured time ta is equal to or less than the threshold value t3, the CPU returns to step 211.

When the CPU proceeds to step 213, the CPU moves the shift position to a parking position and transmits (reports) a predetermined piece of information to the server computer. Subsequently, the CPU proceeds to step 214.

When the CPU proceeds to step 214, the CPU sets the value of the flag F to "0." As a result, repeated issuance of the warning and the report is prevented. Subsequently, the CPU proceeds to step 215.
(Program P3)

The CPU starts execution of the program P3 from step 300 and proceeds to step 301.

When the CPU proceeds to step 301, the CPU determines whether or not the risk reduction function is disabled (whether or not the value of the flag F is "0"). In the case where the risk reduction function is disabled (301: Yes), the CPU proceeds to step 302. Meanwhile, in the case where the risk reduction function is enabled (301: No), the CPU proceeds to step 312 and ends the execution of the program P3.

When the CPU proceeds step 302, the CPU determines, on the basis of the information obtained from the camera 23, whether or not the own vehicle has departed from a lane (whether or not the own vehicle is crossing the dividing line between that lane and a lane adjacent thereto). In the case where the own vehicle has departed from that lane (302: Yes), the CPU proceeds to step 303. Meanwhile, in the case where the own vehicle has not departed from that line, the CPU proceeds to step 312.

When the CPU proceeds to step 303, the CPU determines whether or not the own vehicle has lightly collided with an object (whether or not the condition X is satisfied). In the case where the own vehicle has lightly collided with an object (303: Yes), the CPU proceeds to step 304. Meanwhile, in the case where the own vehicle has not lightly collided with an object (303: No), the CPU proceeds to step 312. Notably, in the case where the impact acting on the own vehicle is very large (the case where the acceleration G exceeds the upper limit of the range GA), the driving assistant ECU 10 immediately stops the own vehicle by executing a program (not shown) whose priority is higher than that those of the program P1 to the program P3.

When the CPU proceeds to step 304, the CPU sets the value of the flag F to "1" (compulsory activation). Subsequently, the CPU proceeds to step 305.

When the CPU proceeds to step 305, the CPU determines whether or not the speed vs of the own vehicle is greater than a threshold value vsth. In the case where the speed vs is greater than the threshold value vsth (305: Yes), the CPU proceeds to step 306. Meanwhile, in the case where the speed vs is equal to or less than the threshold value vsth (305: No), the CPU proceeds to step 312. In this case, by the lane departure prevention function forcedly enabled, the drive apparatus 30, the braking apparatus 40, the steering apparatus 60, etc. are controlled such that the own vehicle travels along the lane. When the state in which the driver does not operate any of the operating elements continues after that, the own vehicle is stopped by the emergency stop function. Notably, since step 305 is executed immediately after the risk reduction function has been forcedly enabled, at this point in time, braking by the emergency stop function (step 209) has not yet been started.

When the CPU proceeds to step 306, the CPU brakes and stops the own vehicle (compulsory stop). Namely, while flashing the hazard lights, the CPU controls the braking apparatus 40, the steering apparatus 60, etc. such that the own vehicle moves to a safe region (for example, a shoulder or a lane where the traffic volume is small), while decelerating, and stops there. Subsequently, the CPU proceeds to step 307. Notably, the CPU executes step 306 preferentially over the program P1 and the program P2.

When the CPU proceeds to step 307, the CPU initializes the measured time tb (output value) of the timer 10e to "0" and causes the timer 10e to start time measurement. Subsequently, the CPU proceeds to step 308.

When the CPU proceeds to step 308, the CPU determines whether or not the driver is operating any of the operating elements (whether or not the operation amounts of all the operating elements are "0"). In the case where the driver is operating none of the operating elements (308: Yes), the CPU proceeds to step 309. Meanwhile, in the case where the driver is operating any of the operating elements (308: No), the CPU proceeds to step 312.

When the CPU proceeds to step 309, the CPU determines whether or not the measured time tb is greater than a threshold value t3. In the case where the measured time tb is greater than the threshold value t3 (309: Yes), the CPU proceeds to step 310. Meanwhile, in the case where the measured time tb is equal to or less than the threshold value t3, the CPU returns to step 308.

When the CPU proceeds to step 310, the CPU moves the shift position to the parking position and transmits (reports) a predetermined piece of information to the server computer. Subsequently, the CPU proceeds to step 312.

When the CPU proceeds to step 311, the CPU sets the value of the flag F to "0." Subsequently, the CPU proceeds to step 312.

(Effects)

In a vehicle on which the above-described vehicle control system 1 is mounted, a driver can manually enable and disable the risk reduction function. When the own vehicle departs from a lane and lightly collides with an object in a state in which the risk reduction function has been manually disabled, the risk reduction function is forcedly enabled. As a result, for example, in a situation where it has become difficult for the driver to drive and operate the own vehicle, the driving and operation are assisted by the driving assistant ECU 10 (LTA). Also, in a situation where the driver has become unable to drive and operate the own vehicle, the own vehicle is stopped by the driving assistant ECU 10 (EDSS). Accordingly, the vehicle control system 1 can enhance safety of the vehicle as compared with the conventional system.

Figure 6:
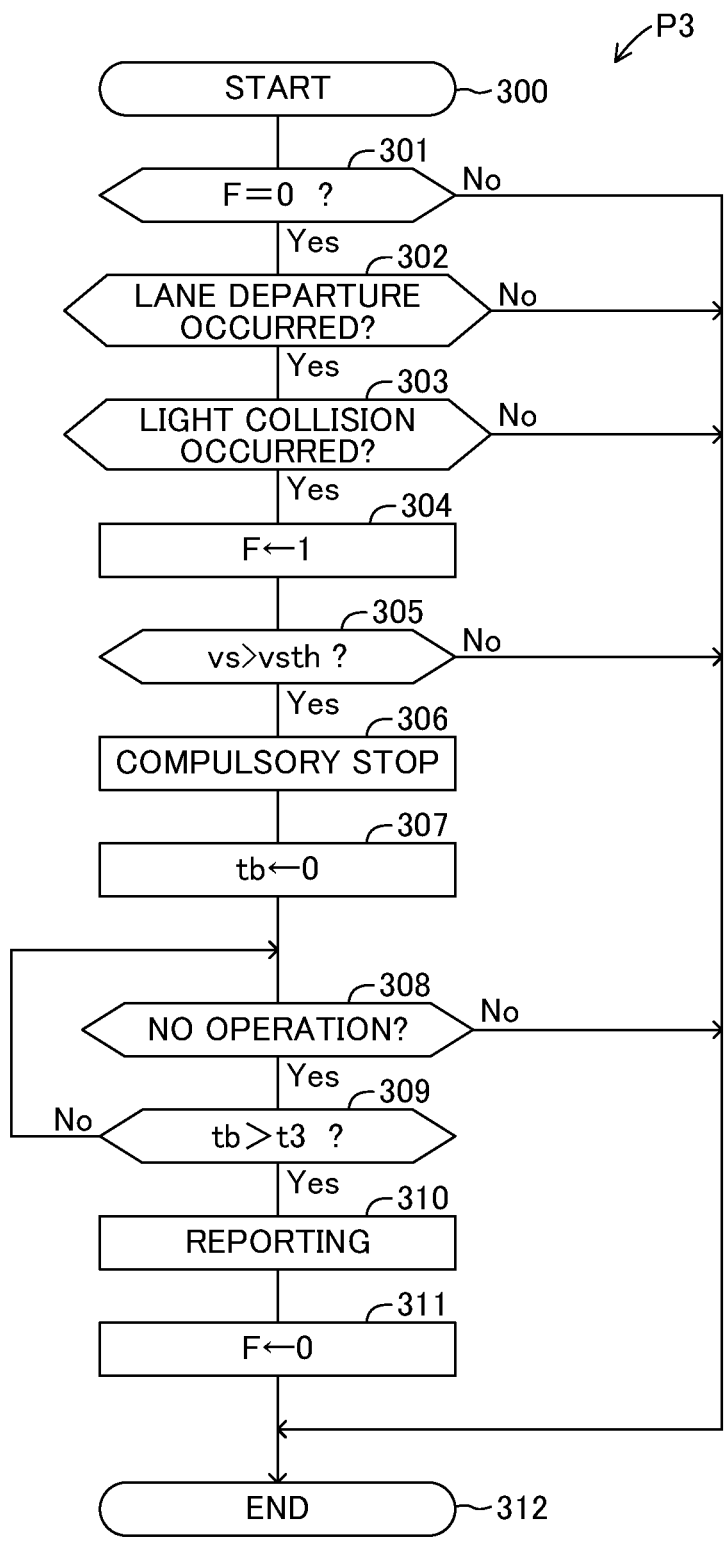
FIG. 6 is a flowchart of a third program (compulsory activation function).

Also, in the case where the own vehicle has lightly collided with an object at a relatively high speed, the own vehicle is stopped immediately (step 305 to step 311 of FIG. 6). As a result, safety of the vehicle can be enhanced further.

The present invention is not limited to the above-described embodiment, and, as will be described below, various modifications can be employed without departing from the scope of the present invention.

<Modification 1>

In the above-described embodiment, when the driver pushes the switch 2b, switching is performed between the state in which both the lane departure prevention function and the emergency stop function are on (are enabled) and the state in which both the lane departure prevention function and the emergency stop function are off (are disabled). Alternatively, the vehicle control system may be configured such that the driver can individually turn on and off the lane departure prevention function and the emergency stop function. For example, there are provided a switch 2b1 for turning the lane departure prevention function on and off and a switch 2b2 for turning the emergency stop function on and off. In this case, instead of the flag F, flags F1 and F2 are used. When the lane departure prevention function is on, the value of the flag F1 is "1," and when the lane departure prevention function is off, the value of the flag F1 is "0." Similarly, when the emergency stop function is on, the value of the flag F2 is "1," and when the emergency stop function is off, the value of the flag F2 is "0."

Figure 4:
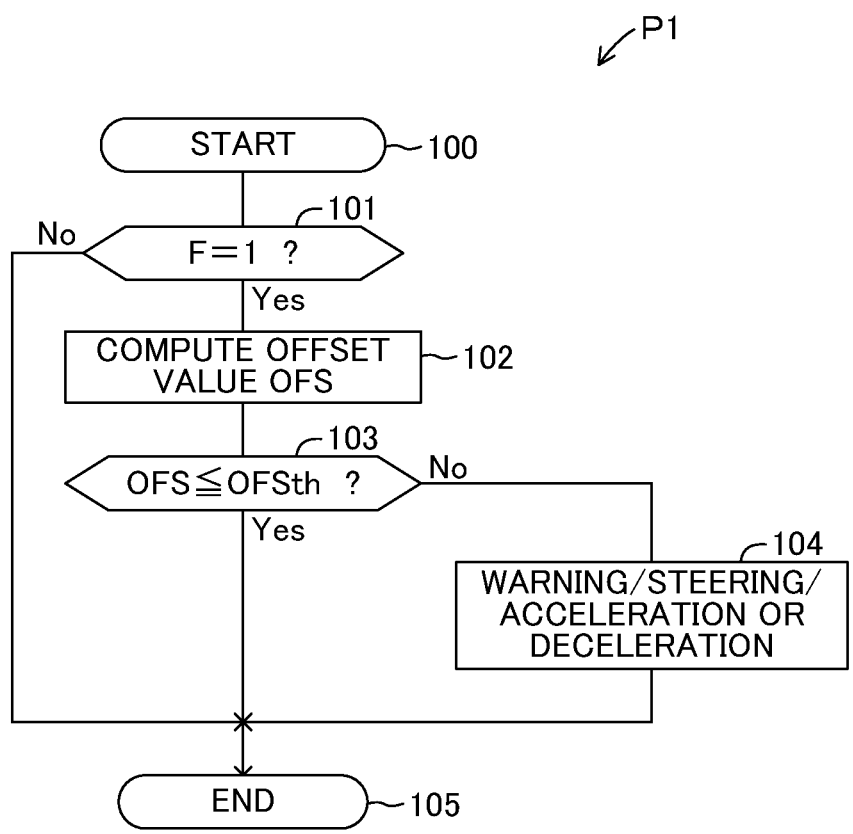
FIG. 4 is a flowchart of a first program (lane departure prevention function)
Figure 5:
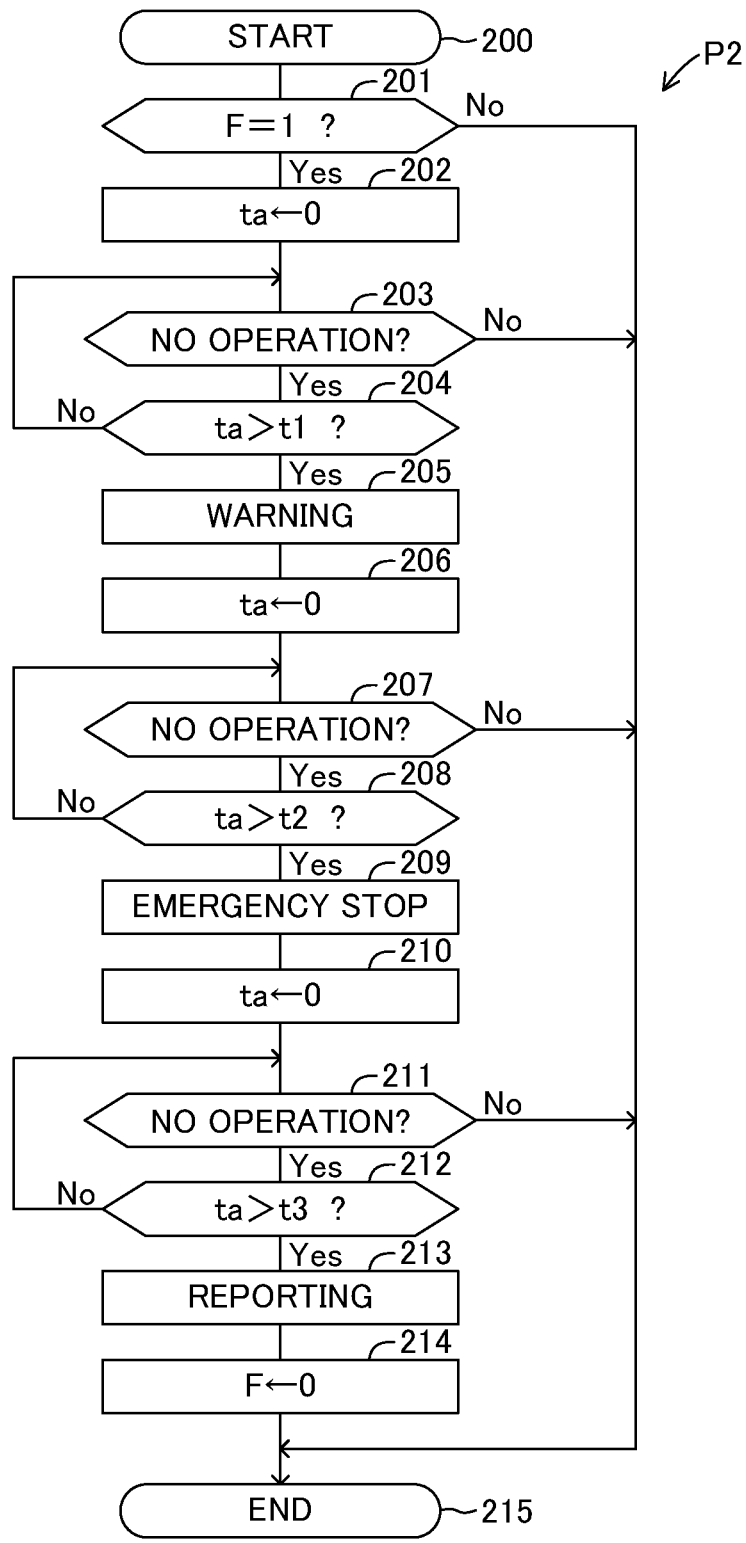
FIG. 5 is a flowchart of a second program (emergency stop function)

In the case, when the CPU determines in step 101 of FIG. 4 that the value of the flag F1 is "1," the CPU proceeds to step 102, and, when the CPU determines in step 101 that the value of the flag F1 is "0," the CPU proceeds to step 105. Also, when the CPU determines in step 201 of FIG. 5 that the value of the flag F2 is "1," the CPU proceeds to step 202, and, when the CPU determines in step 201 that the value of the flag F2 is "0," the CPU proceeds to step 215. Also, the CPU sets the value of the flag F2 to "0" in step 214 of FIG.

5. Also, in this case, when the CPU determines in step 301 of FIG. 6 that at least one of the values of the flags F1 and F2 is "0," the CPU proceeds to step 302, and, when the CPU determines in step 301 that both the values of the flags F1 and F2 are "1," the CPU proceeds to step 312. Also, in step 304, the CPU sets the values of the flags F1 and F2 to "1." Furthermore, in step 311, the CPU sets the values of the flags F1 and F2 to "0."

<Modification 2>

In the above-described embodiment, the CPU determines whether or not the driver is suffering from an abnormal condition by determining whether or not the driver is operating any of the operating elements, and determines, on the basis of the result of the determination, whether to perform braking of the own vehicle and provide a report. Instead of or in addition to the above determination, the CPU may perform the following determination. A camera for photographing the driver is provided in the cabin, and the CPU determines, on the basis of an image obtained from the camera, whether or not the driver is suffering from an abnormal condition. In this case, the CPU is programed to allow the driver to manually perform switching between a state in which a function of determining the state of the driver on the basis of the image of the driver (hereinafter referred to as the "driver image determination function") is enabled and a state in which the driver image determination function is disabled. In the case where the own vehicle departs from a lane and lightly collides with an object in the state in which the driver image determination function has been disabled, the CPU forcedly enables the driver image determination function.

Notably, the vehicle control system 1 may include an apparatus which automatically disables the lane departure prevention function upon detection that the driver has intentionally performed a lane change, an apparatus which automatically enables the lane departure prevention function upon detection that the driver is suffering from an abnormal condition, etc.

The vehicle V may be an autonomous vehicle.

What is claimed is:

1. A vehicle control system comprising:
an on-vehicle sensor for outputting a piece of information regarding an object around an own vehicle and a piece of information regarding a travel state of the own vehicle;
a control apparatus which has, as a risk reduction function, at least one of a lane departure prevention function and an emergency stop function, the lane departure prevention function controlling at least one of a warning apparatus, a drive apparatus, a braking apparatus, and a steering apparatus of the own vehicle, on the basis of the pieces of information obtained from the on-vehicle sensor, such that departure of the own vehicle from a lane in which the own vehicle is travelling is prevented, the emergency stop function stopping the own vehicle when a driver is suffering from an abnormal condition; and
a switching apparatus for enabling and disabling the risk reduction function,
wherein the control apparatus is configured to determine whether the own vehicle has lightly collided with an object,
wherein the control apparatus determines that the own vehicle has lightly collided with the object in the case that an integral value of a magnitude of acceleration of the own vehicle has exceeded a threshold value, the integral value of the magnitude of acceleration being that during a predetermined time from a point in time when (i) the magnitude of the acceleration has exceeded a lower limit of 0 of a predetermined range in which an airbag apparatus does not operate and (ii) has not exceeded an upper limit of the predetermined range in which the airbag apparatus does operate, and
based upon the determination that the own vehicle has lightly collided with the object, forcedly enable the risk reduction function when the own vehicle collides with an objectis in a state in which the risk reduction function has been disabled by the switching apparatus.

2. The vehicle control system according to claim 1,
wherein the switching apparatus includes a first operating element for manually enabling and disabling the lane departure prevention function and a second operating element for manually enabling and disabling the emergency stop function, and
in the case where the own vehicle departs from the lane and collides with an object in a state in which at least one of the lane departure prevention function and the emergency stop function has been manually disabled, the control apparatus forcedly enables the function disabled manually.

3. The vehicle control system according to claim 1, wherein
the risk reduction function is the emergency stop function, and
the control apparatus controls the braking apparatus so as to immediately stop the own vehicle, irrespective of whether or not the driver is suffering from an abnormal condition, in the case where the speed of the own vehicle exceeds a threshold value in a period between a point in time when the control apparatus has forcedly enabled the risk reduction function and a point in time when braking of the own vehicle by the emergency stop function is started.

4. The vehicle control system according to claim 2, wherein
the risk reduction function is the emergency stop function, and
the control apparatus controls the braking apparatus so as to immediately stop the own vehicle, irrespective of whether or not the driver is suffering from an abnormal condition, in the case where the speed of the own vehicle exceeds a threshold value in a period between a point in time when the control apparatus has forcedly enabled the risk reduction function and a point in time when braking of the own vehicle by the emergency stop function is started.

5. The vehicle control system according to claim 1, wherein a state in which the own vehicle lightly collides with the object is a state in which the magnitude of the acceleration is greater than the magnitude of the acceleration that occurs within an ordinary driving state, and less than the magnitude of the acceleration that occurs when an impact on the own vehicle causes the airbag to operate.

* * * * *